(12) United States Patent
Lowchareonkul (10) Patent No.: US 8,538,625 B1
(45) Date of Patent: Sep. 17, 2013

(54) DISPLAY SYSTEM FOR USE IN A VEHICLE

(76) Inventor: Phahol Lowchareonkul, Los Altos Hills, CA (US)

( * ) Notice: Subject to any disclaimer, the term of this patent is extended or adjusted under 35 U.S.C. 154(b) by 1018 days.

(21) Appl. No.: 11/811,741

(22) Filed: Jun. 11, 2007

(51) Int. Cl.
  *B60Q 3/04* (2006.01)
(52) U.S. Cl.
  USPC ............. 701/33.2; 340/425.5; 340/691.6; 340/815.4
(58) Field of Classification Search
  USPC ......... 701/29, 34, 35, 1, 33.2, 36; 340/425.5, 340/691.6, 815.4
  See application file for complete search history.

(56) References Cited

U.S. PATENT DOCUMENTS

| | | | |
|---|---|---|---|
| 5,123,015 A * | 6/1992 | Brady et al. | 370/539 |
| 5,819,201 A | 10/1998 | DeGraaf | |
| 6,295,492 B1 | 9/2001 | Lang et al. | 701/33 |
| 6,330,499 B1 | 12/2001 | Chou et al. | 701/33 |
| 6,356,822 B1 | 3/2002 | Diaz et al. | 701/33 |
| 6,636,790 B1 | 10/2003 | Lightner et al. | 701/33 |
| 6,642,839 B1 * | 11/2003 | Gunderson et al. | 340/435 |
| 6,667,726 B1 * | 12/2003 | Damiani et al. | 345/1.1 |
| 6,690,268 B2 | 2/2004 | Schofield et al. | |
| 6,770,862 B1 * | 8/2004 | Maciuca et al. | 250/208.1 |
| 6,774,774 B2 | 8/2004 | Schofield et al. | 340/442 |
| 6,919,822 B2 | 7/2005 | Tanaka et al. | |
| 6,928,180 B2 | 8/2005 | Stam et al. | 382/104 |
| 6,958,495 B2 | 10/2005 | Nishijima et al. | 257/88 |
| 7,012,727 B2 | 3/2006 | Hutzel et al. | |
| 7,042,616 B2 | 5/2006 | Tonar et al. | 359/265 |
| 7,103,429 B2 | 9/2006 | Newberry | 700/86 |
| 7,103,460 B1 | 9/2006 | Breed | 701/29 |
| 7,116,216 B2 * | 10/2006 | Andreasen et al. | 340/438 |
| 7,184,887 B2 | 2/2007 | Wood et al. | |
| 7,257,468 B1 | 8/2007 | Costa et al. | |
| 7,382,237 B2 | 6/2008 | Stoschek et al. | |
| 7,683,771 B1 * | 3/2010 | Loeb | 340/461 |
| 2002/0049538 A1 | 4/2002 | Knapton et al. | |
| 2003/0099025 A1 * | 5/2003 | Abel et al. | 359/265 |
| 2003/0123473 A1 * | 7/2003 | Satoh et al. | 370/442 |
| 2003/0193393 A1 * | 10/2003 | Ford | 340/506 |
| 2003/0193842 A1 * | 10/2003 | Harrison | 368/82 |
| 2004/0008410 A1 | 1/2004 | Stam et al. | 359/443 |
| 2004/0135808 A1 * | 7/2004 | Sagara et al. | 345/762 |
| 2004/0150516 A1 * | 8/2004 | Faetanini | 340/444 |
| 2004/0155759 A1 * | 8/2004 | Gunderson et al. | 340/435 |
| 2004/0202001 A1 | 10/2004 | Roberts et al. | 362/494 |

(Continued)

OTHER PUBLICATIONS

WO 02055356 Translation.*

*Primary Examiner* — Thomas Black
*Assistant Examiner* — Ce Li
(74) *Attorney, Agent, or Firm* — R&D Patent Attorneys; Kevin Roe (57) ABSTRACT

In an embodiment, a display system and method configured to be used for providing a user with information regarding the operating conditions of the vehicle. The system comprises a sensor that is configured to measure an operating condition of the vehicle, wherein the sensor provides a measurement signal based on the measured operating condition. The system includes a processor which is coupled to the sensor and configured to receive the measurement signal. The system includes a display module, preferably an organic light emitting diode (OLED), which is mounted to the vehicle, wherein the OLED displays sensor data received from the processor which is associated with the measurement signal and is to be read by a user. The sensor data is selectively displayed in compliance with a customizably programmable display profile, whereby the user is able to create and transfer the display profile in which form desired.

19 Claims, 4 Drawing Sheets

(56) References Cited

U.S. PATENT DOCUMENTS

| | | | |
|---|---|---|---|
| 2005/0012599 A1* | 1/2005 | DeMatteo | 340/425.5 |
| 2005/0052476 A1* | 3/2005 | Tyrell | 345/690 |
| 2005/0096805 A1 | 5/2005 | Fudali et al. | 701/29 |
| 2005/0197747 A1* | 9/2005 | Rappaport et al. | 701/1 |
| 2006/0009889 A1 | 1/2006 | Bernard | 701/29 |
| 2006/0017552 A1* | 1/2006 | Andreasen et al. | 340/438 |
| 2006/0059430 A1* | 3/2006 | Bells et al. | 715/747 |
| 2006/0071766 A1 | 4/2006 | O'Brien et al. | 340/442 |
| 2006/0089870 A1 | 4/2006 | Myhr | 705/14 |
| 2006/0125919 A1 | 6/2006 | Camilleri et al. | 348/148 |
| 2006/0266273 A1* | 11/2006 | Westberg et al. | 116/62.1 |
| 2006/0271246 A1 | 11/2006 | Bell et al. | |
| 2006/0282204 A1 | 12/2006 | Breed | 701/49 |
| 2006/0290647 A1 | 12/2006 | Oron et al. | 345/102 |
| 2007/0001831 A1 | 1/2007 | Raz et al. | 340/439 |
| 2007/0005199 A1 | 1/2007 | He | 701/16 |
| 2007/0013624 A1 | 1/2007 | Bourhill | 345/84 |
| 2007/0032950 A1 | 2/2007 | O'Flanagan et al. | |
| 2007/0124043 A1 | 5/2007 | Ayoub et al. | |
| 2007/0146235 A1* | 6/2007 | Nolan et al. | 345/7 |
| 2007/0185627 A1 | 8/2007 | Mavreas | |

\* cited by examiner

DISPLAY SYSTEM FOR USE IN A VEHICLE

TECHNICAL FIELD

The present disclosure relates generally to vehicle display systems.

BACKGROUND

Vehicles such as automobiles, boats and motorcycles include between one and several displays which inform the vehicle's operator of the operating conditions of the vehicle. Automobile enthusiasts commonly modify their vehicle to allow it to run faster, smoother and more efficiently. This may include modifying the engine and/or the engine controls, adjusting the air-fuel mixture, and such. To aid in properly monitoring whether the vehicle is operating under optimum conditions, the user may install one or more after-market dashboard sensor and displays which present data to the user of the vehicle's operating conditions. However, the displays which are available on the market are limited by the type and amount of information that can be displayed to the user.

OVERVIEW

In an embodiment, a display system and method configured to be used for providing a user with information regarding the operating conditions of the vehicle. The system comprises a sensor that is configured to measure an operating condition of the vehicle, wherein the sensor provides a measurement signal based on the measured operating condition. The system includes a processor which is coupled to the sensor and configured to receive the measurement signal. The system includes a display module, preferably an organic light emitting diode (OLED), which is mounted to the vehicle, wherein the OLED displays sensor data received from the processor which is associated with the measurement signal and is to be read by a user. The sensor data is selectively displayed in compliance with a customizably programmable display profile, whereby the user is able to create and transfer the display profile in which form desired.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

In the drawings.

DESCRIPTION OF EXAMPLE EMBODIMENTS

Example embodiments are described herein in the context of a system for displaying operating conditions of a vehicle using customized display profiles. Those of ordinary skill in the art will realize that the following description is illustrative only and is not intended to be in any way limiting. Other embodiments will readily suggest themselves to such skilled persons having the benefit of this disclosure. Reference will now be made in detail to implementations of the example embodiments as illustrated in the accompanying drawings. The same reference indicators will be used throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with this disclosure, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, microcontrollers, field programmable gate arrays (FPGAs), application specific integrated circuits (ASICs), or the like, may also be used without departing from the scope and spirit of the inventive concepts disclosed herein. It is understood that the phrase "an embodiment" encompasses more than one embodiment and is thus not limited to only one embodiment. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Eraseable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card, paper tape and the like) and other types of program memory.

Figure 1:
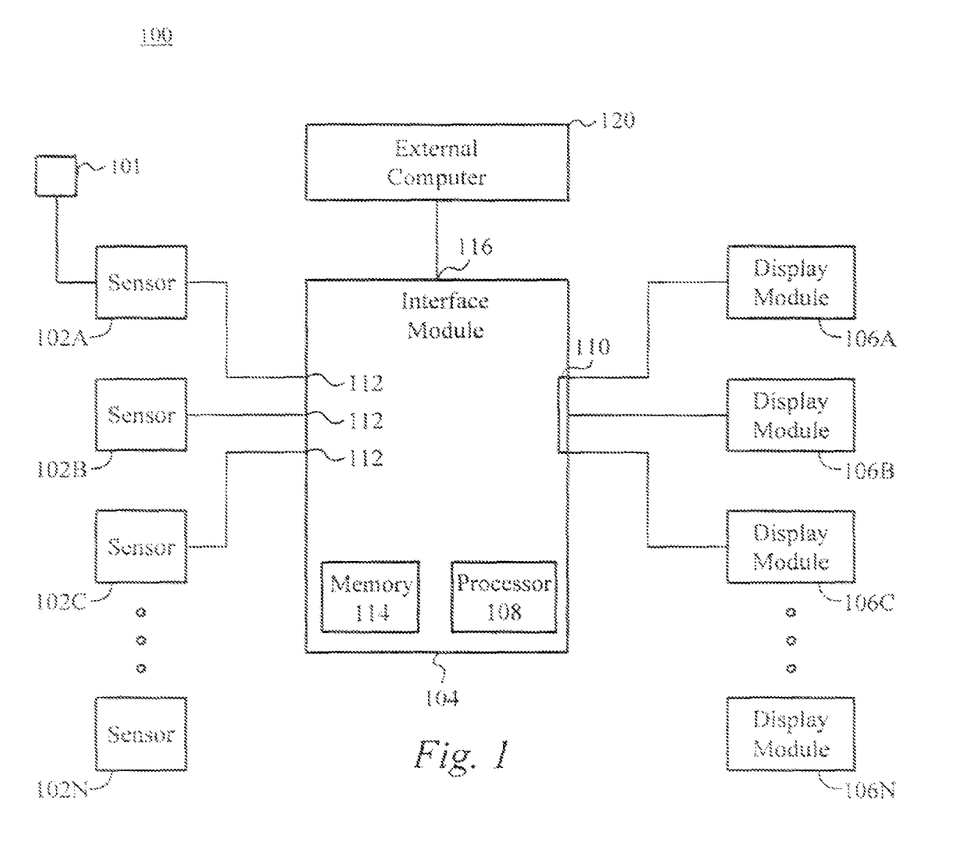
FIG. 1 illustrates a block diagram of the vehicle display system in accordance with an embodiment.

FIG. 1 illustrates a block diagram of a vehicle display system in accordance with an embodiment. The vehicle display system 100 is preferably an aftermarket system which provides a customizable display and data processing system to allow the driver of a vehicle to monitor the operating conditions in real-time. It is contemplated, however, that the vehicle display system 100 described herein would not be an aftermarket system and may be incorporated into the vehicle while the vehicle is being manufactured.

As shown is FIG. 1, the system 100 includes a sensor module (generally described as 102) coupled to one or more sensors 101 and an interface module or device (generally described as 104). In addition, the system 100 includes a display module or device (generally described as 106) coupled to the interface module 104. Three sensor modules 102A, 102B, 102C are shown in FIG. 1 although any number of sensor modules 102N, including just only one sensor module, is contemplated. In addition, one interface module 104 is shown in FIG. 1 although more than one interface module coupled to one another or separate from one another is contemplated. Further, three display modules 106A, 106B, 106C are shown in FIG. 1 although any number of displays 106N, including one, is contemplated.

In one or more embodiments, the sensor modules 102 sense, measure and provide data to the interface module 104 regarding one or more operating conditions of the vehicle. The measured data includes but is not limited to: air-fuel ratio, exhaust gas temperature, fluid temperature, pressure, vacuum, air intake temperature, sound, speed, distance, fuel level, voltage, throttle position, engine load, air flow rate, fuel trim, knock, power, torque, current, vapor output (e.g. smog, carbon monoxide), and/or any other operating condition of the vehicle. In an embodiment, the sensor modules 102 are coupled to the interface module 104 with one or more wires, although the sensor modules 102 can alternatively communicate with the interface module 104 wirelessly. In an embodiment, the sensor modules 102 output the sensor signals in analog form, although the sensor signals may alternatively be output in digital form. Any appropriate type of sensor modules are utilized with the system and particular details of the types of sensors are not discussed herein.

Figure 2:
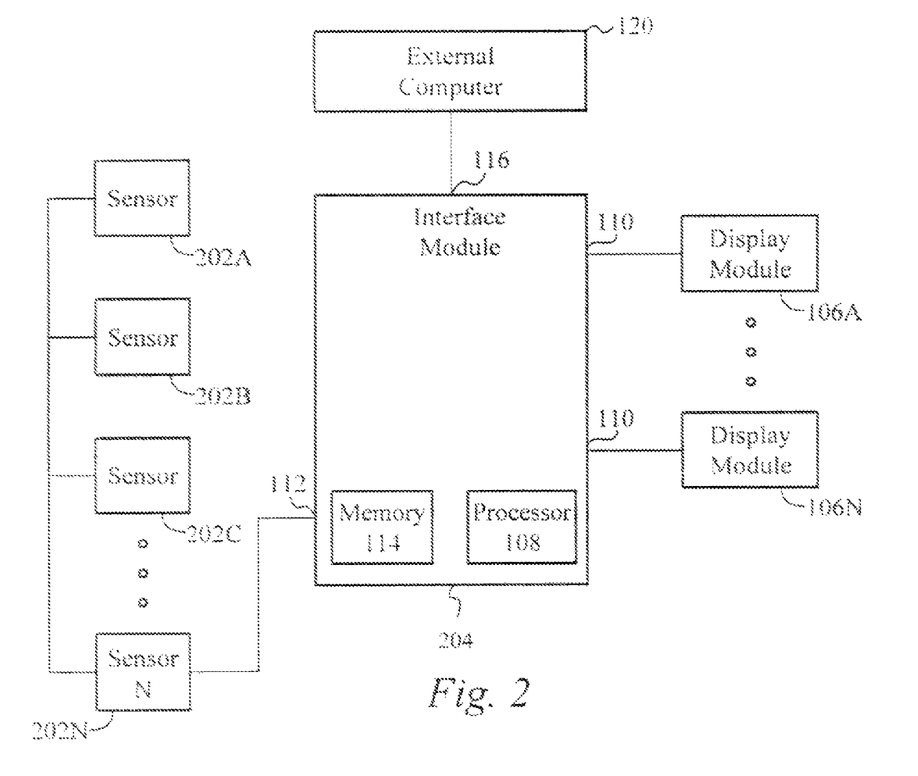
FIG. 2 illustrates a block diagram of the vehicle display system in accordance with an embodiment.

In an embodiment, as shown in FIG. 1, the sensor modules 102 are individually and separately coupled to the interface module 104, whereby the interface module 104 receives and processes sensor signals from each sensor module 102 substantially simultaneously. In an embodiment, as shown in FIG. 2, one or more of the sensor modules 202 are coupled to other sensor modules 202 serially in a "daisy-chain" fashion or by time division multiplexing. In particular, as shown in FIG. 2, a sensor module 202A is coupled to sensor module 202B, whereby sensor module 202B is coupled to sensor module 202C, and so on to sensor module 202N. As shown, sensor module 202C is coupled to the interface module 104. In the embodiment in FIG. 2, sensor signals from sensor module 202A are transferred to sensor module 202B. In other words, the data output from sensor module 202B will include not only the sensor signals from sensor module 202B, but also the sensor signals from sensor module 202A in a time division multiplexed manner. Upon sensor module 202C outputting the sensor signal to the interface module 204, the interface module 204 will receive sensor data signals from each sensor module 202. Although not shown, a clock signal is provided between the sensor modules 202 and the interface module 204 which allow the sensor signals to be properly multiplexed in the signal received by the interface module 204.

In an embodiment, the interface module 104 includes a port 110 to connect it to the display module 106. In an embodiment, the interface module 104 includes one or more ports 112 which connect it to the sensor modules 102. Although the sensor modules 102 are preferably installed onto the vehicle and coupled to the interface module 104, it is contemplated that the interface module 104 can communicate and receive information from already existing sensors in the automobile. This would result in the system 100 be able to provide the user with not only with operating conditions from the aftermarket sensors, but also from sensors already built into the vehicle during manufacture.

The interface module 104 includes a processor 108 which communicates with the sensor modules 102 via the one or more ports and a memory 114 which is coupled to the processor 108. In an embodiment the interface module 104 includes a port to couple it with another interface module (not shown). This allows scalability of the system to handle additional sensor modules and display modules 106 as well as possess a modular characteristic. Upon the interface module 104 receiving the sensor signals, the processor 108 processes the data and outputs the processed data via port 112 to the display module 106. In an embodiment, the interface module 104 includes a wired communications port 116 such as a Universal Serial Bus (USB) RS232 or Firewire type port, whereby data is transferred between the interface module 104 and an external computer (e.g. laptop, server, existing vehicle computer). As discussed in more detail below, the communications port 116 allows the user to transfer data to the processor interface device 104 from the external computer. Additionally or alternatively, the communications port 116 facilitates transfer of stored sensor data from the system to the external computer for analysis purposes. In an embodiment, the interface module 104 includes a wireless communication port in addition to or alternative to the wired communications port 116 to perform these functions.

The interface module 104 includes an analog to digital converter (not shown) in an embodiment, whereby the interface module 104 receives analog sensor signals from the sensor modules 102. It is contemplated in an embodiment, however, that the interface module 104 may be configured to be entirely analog-based, whereby an analog to digital converter is placed either at the output of the interface module 104 or the input of the display module 106. In an embodiment, the interface module 104 is configured to automatically sense and/or register with each sensor module 102 upon being connected the interface module 104.

The system 100 is configured to measure, process, and output sensor data to be displayed by the display module 104 various formats, such as numeral, table and/or graphical. In an embodiment, the system 100 includes a speaker (not shown) which audibly provides operating conditions to the user. The system 100 is able to process data in a sensor table format such as a database of numbers and algorithms used to convert sensor data into specific output formats which can be easily read by the user. The sensor table can be uploaded to the device for updating and recognizing new sensors once they are available. In an embodiment, the user is able to view each sensor's information at the same time on the display screen. In an embodiment, the user is able to toggle among the different screens from each sensor using a remote control, touch screen of the display screen, voice recognition or the like.

In an embodiment, the interface device 104 accepts and stores user set parameter values which are then used in informing the user of the vehicle's operating conditions. For example, the user may set minimum and maximum values for one or more particular operating conditions. The system 100 keeps track of sensor data and compares it in real time with the perimeter values. In an embodiment, the system 100 alerts the user either audibly and/or visually when the sensor values are at or are approaching the perimeter set values. In an embodiment, the system 100 is able to store sensor data and calculate as well as display trends over a user set period of time via the display module 106.

It is preferred that the system 100 is able to present data from the sensors in a variety of set or customized display profiles or formats. In an embodiment, the processor 108 is a logic device or microprocessor which converts raw data from the sensor modules 102 into a format which complies with set parameters of a display profile to be displayed by the display module 106. The processor 108 is preferably programmable by the user to automatically convert the sensor signals and output the processed data in the desired format.

In an embodiment, the processor 108 may be programmed to output raw data from the sensor modules 102 in a digital alphanumeric format, graph format, digitized analog format (e.g. digital dial), table showing data from multiple sensors, etc. In an embodiment, the processor 108 may execute software instructions created by the user to output customized display profiles of the sensor data. For example, the display results may be customized based on font size, color, font type, line thickness, and/or other display effects. In an embodiment, the user is able to create a display profile having a graphical user interface with a plurality of template components including backgrounds, wallpapers, foreground graphics, special effects, animation, videos and/or sounds. The template components can be easily developed by the user using a software developers toolkit (SDK) as discussed in more detail below.

The software instructions are in the form of computer code embodied in a file and/or a series of data packets which can be easily transferred to and from the interface device 104. For example, the user may transfer an already existing display profile to an external computer, whereby the user may change one or more template components using the SDK and transfer the modified file back to the interface device 104. The system will then display the operating conditions consistent with the modified display profile via the display module 106. It is contemplated that the program instructions may be purchased from a website and downloaded to the user's computer or directly to the interface module 104.

As stated above, the display profile may be created by the user using a software developer's toolkit, whereby the software instructions are transferred to the interface module 104. In an example, a display profile may be designed of a digital representation of an analog needle gauge, as shown in FIG. 3B, in which the numbers remain stationary and the needle rotates about the center to point to the number corresponding to the sensor data received by the interface device 104. The user is then able to transfer the display profile to the interface module 104 which then loads the file and automatically displays the representation of the needle on the display module 106. The software instructions preferably maps the customized gauge to properly respond to sensor values, from a minimum value all the way to a maximum value (0-20 in the example in FIG. 3B), received from the sensors such that the needle will move to the proper value on the gauge based on the measurements. It is contemplated that any appropriate known method of properly corresponding the display with the received sensor values is contemplated.

Figure 3A:
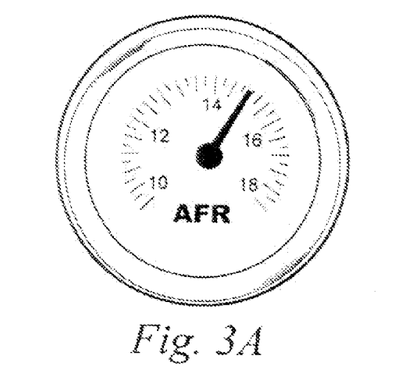
FIGS. 3A-3C illustrate various example display profiles in accordance with various embodiments.
Figure 3B:
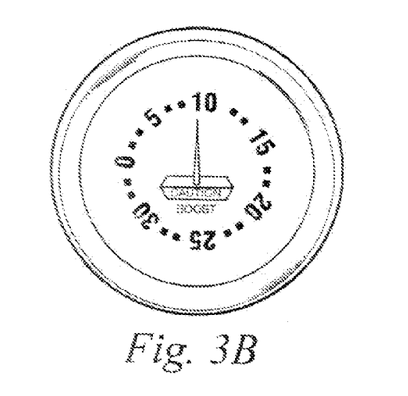

In another example shown in FIG. 3A, a display profile of a digital representation of another type of analog gauge is loaded into the interface module 104 to be output on the display module 106. In this example, the needle remains stationary while the numbers rotate about the center such that the raw data value is aligned with the top of the needle. The interface module 104 upon reading the software instruction will constantly update the display to correspond with the received sensor data such that the number at the top of needle will correspond to the sensor value received in real time. This may be done by mapping the display profile such that the numbers properly move about the center to correspond with the sensor data such that the received sensor value at any instant is pointed to by the needle. It is contemplated that any appropriate known method of properly corresponding the display with the received sensor values is contemplated.

Figure 3C:
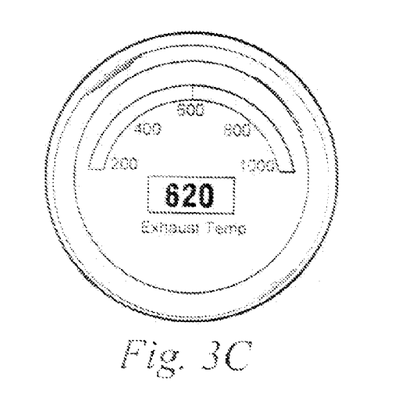

In another example shown in FIG. 3C, a display profile of a digital counter having a color coded semicircular bar above the counter is loaded into the interface module 104 to be output on the display module 106. In this example, the counter displays the sensor value while the semi circular bar is filled with a color which corresponds with the numbers below the bar but above the digital counter. The interface module 104 will constantly update the display to correspond with the received sensor data such that the portion of the bar that is filled corresponds in real time with the sensor value received and displayed. It is contemplated that any appropriate known method of properly corresponding the display with the received sensor values is contemplated.

The display profile may be programmed to output one or more wallpaper templates that are displayed as the background by module 106. In an example, the wallpaper is a digitized image or photo in any format (e.g. jpg., bmp., etc) which is transferred to and stored by the interface module 104. In an embodiment, the display profile includes templates that have insertable data fields which can be populated with sensor data. In an embodiment, the templates are already programmed into the processor 108 prior to installation. In an embodiment, the background templates may be created and/or customized by the user, whereby the background template is transferred to the interface device 104. The interface module 104 may store the uploaded files in the memory 114 for later retrieval. The template files may be already be written and available on a website whereby the desired software file is purchased from the website and downloaded to the user's computer or directly to the interface module 104. Additionally or alternatively, the template file may be created by the user using a developer's toolkit.

In an embodiment, the user is able to transfer one or more executable software files to the interface device 104, whereby the device 104 executes the file to perform a specific function attributed to the software file. Such files include standard firmware upgrade files as well as packages to enhance the user's experience with the display system 100 other than or in addition to a customized display profile. In an embodiment, the interface module 104 executes the uploaded file and applies the sensor data to output specialized data presentations via the display 106. For example, the user may desire to see how efficient a particular model of an installed automotive component (e.g. catalytic converter, engine performance chip, etc.) is operating in relation to other types of similar components. The user is thus able to upload a driver, patch or other type of executable file which analyzes and reports information to the user regarding that particular installed component based on sensor data and compares that data to known data of other similar components. In another example, a program may be loaded into the interface module 104 which compares sensed data of an installed component with optimum operating conditions of that installed component and provides the user with real time comparison data to show how the installed component is performing. In an instance, the downloaded program itself may include algorithms which automatically calculate and display efficiency ratios between the sensed data and the downloaded reference data. It should be noted that the above is just an example, and any other types of programs, patches, drivers and/or software applications for other purposes may be loaded to, applied and run by the interface device 104. The software may be already be written and available on a website whereby the software file is purchased from the website and downloaded to the user's computer or directly to the interface module 104. Additionally or alternatively, the software may be created by the user using the SDK which is ten loaded onto the interface module 104.

FIGS. 3A-3C illustrates the display module 106 in accordance with various embodiments. In an embodiment, the display module includes a housing 300 having a display component 302 located within. The housings in FIGS. 3A-3C are shown having a circular shape, although other shape designs are contemplated. The housings are a standard 52 mm diameter gauge, although other sizes are contemplated, which can be fit into any standard aftermarket interior-housing. In an embodiment, the display module 106 is a stand alone device, however the display module 106 may be attached to a mounting which is mounted onto the interior of a vehicle. In an embodiment, more than one display module 106 is mounted as a set to the interior of the vehicle.

It is preferred that the display component is an organic light emitting diode (OLED) 302. The OLED is typically inexpensive and small compared to other types of display components. The OLED produces over 60,000 colors and has a large viewing angle of approximately 180°. In addition, the OLED produces a high contrast which allows the user to read the display in direct sunlight. Although the OLED is described herein as the preferred display component, it is intended that other types of display components besides the OLED may be utilized in the display system 100. The OLED preferably includes an integrated color pallet which itself may be customized by the user, whereby more than one color may be applied to a particular pixel.

In an embodiment, an apparatus for use in a vehicle comprising a sensor configured to measure an operating condition of the vehicle, wherein the sensor provides a measurement signal based on the measured operating condition; a processor coupled to the sensor and configured to receive the measurement signal; and an organic light emitting diode (OLED) adapted to be mounted to the vehicle and coupled to the processor, wherein the OLED displays sensor data received from the processor associated with the measurement signal to be read by a user, the sensor data selectively displayed in compliance with a customizably programmable display profile.

Figure 4:
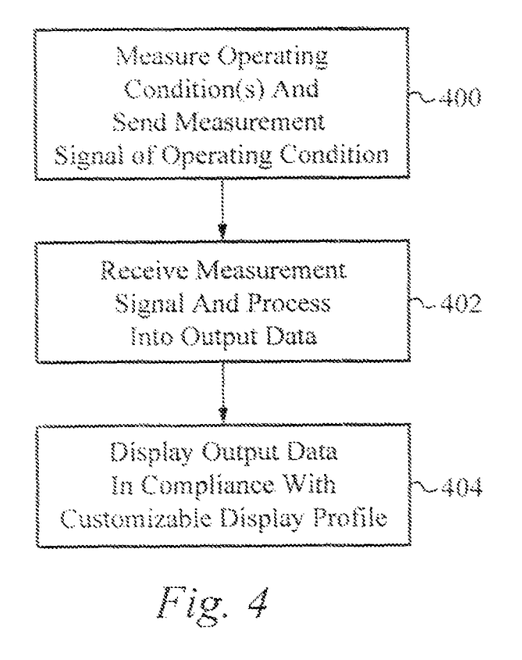
FIG. 4 illustrates a flow chart of the method of utilizing the system in accordance with an embodiment.

In an embodiment, a method for displaying an operating condition comprising: measuring an operating condition of a vehicle and sending a measurement signal associated with the operating condition (400 in FIG. 4); receiving the measurement signal at a processor and outputting a sensor data signal based on the measurement signal (402); and displaying sensor data associated with the sensor data signal via an organic light emitting diode (OLED) adapted to be mounted to the vehicle and coupled to the processor, wherein the OLED selectively displays the sensor data in compliance with a customizably programmable display profile instructed to be run by said processor (404).

In an embodiment, software encoded in one or more computer-readable media adapted for execution by a machine and when executed operable to perform a method, the method comprising: receiving a measurement signal from a sensor mounted to a vehicle, the measurement signal associated with an operating condition of the vehicle; outputting a sensor data signal based on the measurement signal; and displaying sensor data associated with the sensor data signal via an organic light emitting diode (OLED) adapted to be mounted to the vehicle and coupled to the processor, wherein the OLED selectively displays the sensor data in compliance with a customizably programmable display profile instructed to be run by said processor.

In an embodiment, an apparatus for use in a vehicle comprising: a sensor configured to measure an operating condition of the vehicle, wherein the sensor provides a measurement signal based on the measured operating condition; a processor coupled to the sensor and configured to receive the measurement signal, the processor configured output sensor data corresponding to the measurement signal, the processor configured to output said sensor data in a first display form when instructed to run a first set of software executable instructions, the processor configured to output said sensor data in a second display form when instructed to run a second set of software executable instructions; and an organic light emitting diode (OLED) adapted to be mounted to the vehicle and coupled to the processor, the OLED configured to selectively display said sensor data in the first display form in real time and said sensor data in the second display form in real time while the vehicle is operating, wherein the processor is capable of receiving a third set of software executable instructions created by a user, wherein said OLED displays said sensor data in a third display form corresponding to said third set of software executable instructions.

In one or more embodiments, the display profile further comprises a plurality of template components, wherein processor corresponds the measurement signal with the template components to output the sensor data in compliance with the display profile. In one or more embodiments, the display profile is a software executable file, wherein the file is created on an external computer and transferred to the processor. In one or more embodiments, the display profile is modifiable to create a modified display profile wherein the modified display profile is created by the user on said external computer. In one or more embodiments, the sensor further comprises a plurality of sensors configured to measure a plurality of operating conditions of the vehicle, wherein the sensors are coupled directly to the processor in a serial and/or parallel configuration. In one or more embodiments, the sensor further comprises a plurality of sensors, wherein the processor receives a first measurement signal from a first sensor and a second measurement signal from a second sensor, wherein sensor data of the first sensor and sensor data of the second sensor are displayed in an order via the OLED wherein the processor is configured to compare sensor data from the first and second sensors and output said comparison via the OLED. In one or more embodiments, the OLED includes an integrated color palette configured to be customizable to output a plurality of colors. In one or more embodiments, the processor is configured to output one or more digital representations of an analog output, a digital output, a graph and/or a table to the OLED. In one or more embodiments the processor displays maximum and/or minimum measurement values from one or more sensors over a duration via the OLED.

While embodiments and applications have been shown and described, it would be apparent to those skilled in the art having the benefit of this disclosure that many more modifications than mentioned above are possible without departing from the inventive concepts disclosed herein.

What is claimed is:

1. A vehicle-mounted apparatus comprising:
a first interface module configured to communicate with at least one first sensor module that measures a first operating condition of the vehicle, wherein the at least one first sensor module provides a first measurement signal based on the first measured operating condition to the first interface module;
a second interface module coupled to the first interface module in a daisy chain fashion through a port, wherein the first and second interface modules are modularly configured to be scalable to connect with one or more additional interface modules, the second interface module configured to communicate with at least one second sensor module that measures a second operating condition of the vehicle, wherein the at least one second sensor module provides a second measurement signal based on the second measured operating condition to the second interface module, the second interface module configured to output the first measurement signal with the second measurement signal in a time division multiplexed manner;
wherein each interface module includes a processor and a memory, wherein the second interface module is configured to receive at least the multiplexed first and second measurement signals and display sensor data representative of the received multiplexed measurement signals in compliance with a customizably programmable display profile;

wherein the interface modules and the display module are not integrated in a dashboard of the vehicle.

2. The apparatus of claim 1, wherein the display profile further comprises a plurality of template components, wherein a processor corresponds the measurement signal with the template components to output the sensor date in compliance with the display profile.

3. The apparatus of claim 1, wherein the display profile is a software executable file, wherein the file is created on an external computer and transferred to the processor.

4. The apparatus of claim 3, wherein the display profile is modifiable to create modified display profile wherein the modified display profile is created by the user on said external computer.

5. The apparatus of claim 1, wherein the at least one first sensor further comprises a plurality of first sensors configured to measure a plurality of respective operating conditions of the vehicle, wherein the plurality of first sensors are coupled to the processor of the first sensor module in a serial configuration.

6. The apparatus of claim 1, wherein the processor is configured to compare sensor data from the first and second interface modules with one or more set perimeter values and output said comparison via the display, wherein the display outputs an alert when the comparison is within a threshold of the one or more set perimeter values.

7. The apparatus of claim 1, wherein the display further comprises an OLED display, wherein the OLED display includes an integrated color palette configured to be customizable to output a plurality of colors.

8. The apparatus of claim 1, wherein the processor is configured to output one or more digital representations of an analog output, a digital output, a graph and/or a table to the display.

9. The apparatus of claim 1, wherein the processor displays maximum and/or minimum measurement values from one or more sensor modules over a duration via the display.

10. The apparatus of claim 1, wherein at least one sensor module communicates the measurement signals wirelessly to an interface module.

11. A method for displaying an operating condition of a vehicle comprising:

installing a plurality of interface modules, in a vehicle, wherein each interface module includes an input port and an output port, each interface module is coupled to one or more sensors configured to measures an operating condition of the vehicle, wherein measurement signals representative of the operating condition of the vehicle are sent from the one or more sensors to their respective interface modules, the interface modules being modularly configured to be scalable to connect with one or more additional interface modules;

coupling the plurality of interface modules serially in a daisy chain through a port, wherein each interface module combines measurement signals from its respective sensor with the measurement signals received from one or more interface modules located upstream in the daisy chain in a time division multiplexed manner;

receiving the measurement signals from the coupled interface modules at an interface module and processing, using a processor, the multiplexed measurement signals into sensor data; and displaying sensor data associated with the sensor data via a display module coupled to the processor, wherein the display module receives the sensor data from the plurality of interface modules and selectively displays the sensor data in compliance with a customizably programmable display profile;

wherein the interface modules and the display module are not integrated in a dashboard of the vehicle.

12. The method of claim 11, wherein the display profile further comprises a plurality of template components, wherein processor corresponds the measurement signal with the template components to output the sensor data in compliance with the display profile.

13. The method of claim 11, wherein the display profile is a software executable file, wherein the file is created on an external computer and transferred to the processor.

14. The method of claim 11, wherein the processor is configured to compare sensor data from the interface modules with one or more set perimeter values and output said comparison via the display module, wherein the display module outputs an alert when the measurement values are within a threshold of the one or more set perimeter values.

15. The method of claim 11, wherein the display module further comprises an OLED display, wherein the OLED display includes an integrated color palette configured to be customizable to output a plurality of colors.

16. The method of claim 15, wherein the processor is configured to output one or more digital representations of an analog output, a digital output, a graph and/or a table to the OLED display.

17. The method of claim 11, wherein at least one sensor module communicates the measurement signals wirelessly to an interface module.

18. A vehicle-mounted apparatus comprising:

a plurality of modular based interface modules coupled serially to one another in a daisy chain through a port, wherein each interface module is coupled respectively to one or more sensors that measure one or more operating conditions of a vehicle, wherein each interface module outputs measurement signals received from its respective one or more sensors to a subsequent interface module in the daisy chain, wherein the subsequent interface module arranges the received measurement signals in a time division multiplexed manner with measurement signals of its own one or more sensors, the interface modules being modularly configured to be scalable wherein at least one interface module is configured to be coupled to at least one additional interface module;

wherein each interface module processes measurement signals to output sensor data representative of the operating conditions of the vehicle; and a display module coupled to at least one of the interface modules, wherein the display module displays the output sensor data in compliance with a customizably programmable display profile;

wherein the interface modules and the display module are not integrated in a dashboard of the vehicle.

19. The apparatus of claim 18, wherein at least one sensor module communicates the measurement signals wirelessly to an interface module.

* * * * *